L. P. ALLEN.
Gate.
No. 234,515.  Patented Nov. 16, 1880.
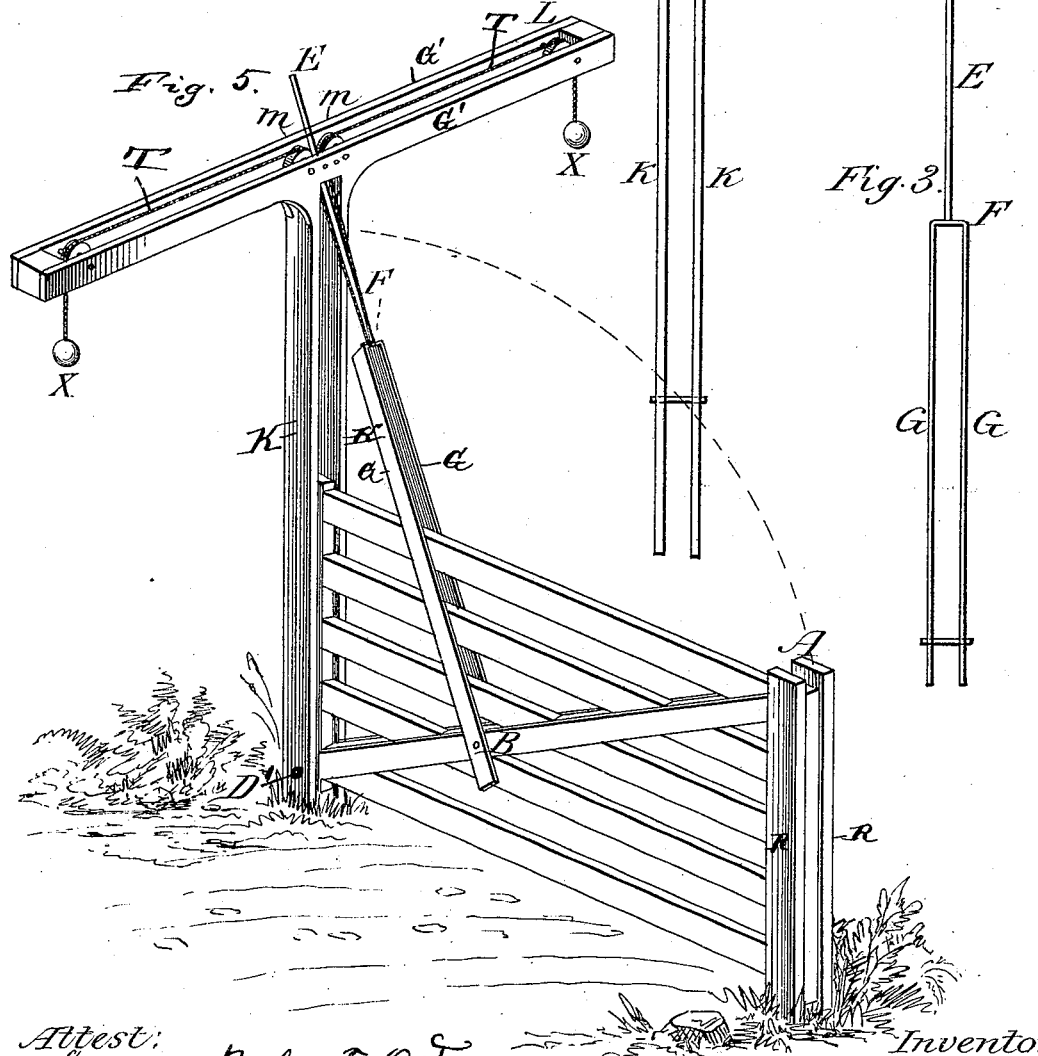

UNITED STATES PATENT OFFICE.

LUTHER P. ALLEN, OF GREENFIELD, ILLINOIS.

GATE.

SPECIFICATION forming part of Letters Patent No. 234,515, dated November 16, 1880.

Application filed September 20, 1878.

*To all whom it may concern:*

Be it known that I, LUTHER PRENTICE ALLEN, of Greenfield, in the county of Greene and State of Illinois, have invented a new and useful Improvement in the Manner of Opening and Closing Gates, of which the following is a specification.

This invention relates to mechanism for opening and closing gates; and it consists in the improved features of construction and combination hereinafter fully described, and particularly pointed out in the claim.

In the annexed drawings, Figure 1 is a side view of the gate detached. Fig. 2 is a side view of the hinge. Fig. 3 is a view of the forked rod or bail used for operating the gate. Fig. 4 is a view of the main posts with the transverse arms or cross-bars, and Fig. 5 is a perspective view of the gate ready for operation.

Corresponding parts in the several figures are denoted by like letters of reference.

In the drawings, A represents a common panel-gate, provided at one of its lower corners with a hinge, D. (Shown in detail in Fig. 2.) Gate A is hinged upon the bolt D' of hinge D, between two posts or uprights, K K, the upper ends of which are connected by parallel transverse cross-bars G' G'.

R R are the posts between which the free end of the gate fits when closed.

F is a bail, the legs of which G G straddle the gate A, to which they are pivoted at B. From the upper end of bail F a guide-rod, E, projects up between the posts K K and cross-bars G' G', as shown in Fig. 5.

L L are pulleys, journaled between the cross-bars G' G' at the extreme ends thereof. Pulleys *m m* are also journaled between said cross-bars, closely adjoining the posts. Ropes T, having weights X, are adjusted upon the pulleys *m* L, and have their inner ends attached to the upper end of the bail F.

It will be seen from the foregoing description that the gate is balanced by the weights X X. When the latter are lowered the gate is raised or swung up, and vice versa.

Having thus described my invention, I claim and desire to secure by Letters Patent of the United States—

The combination of the uprights K K, transverse cross-bars G' G', pulleys *m* L, bail F, having legs G and rod E, ropes T T, and the gate A, all combined and operating substantially as and for the purpose herein shown and specified.

LUTHER PRENTICE ALLEN.

Witnesses:
   ISAAC ROBORTS OSTROM,
   JANE ANN ALLEN.